United States Patent
Sharma et al.

(10) Patent No.: US 11,466,147 B2
(45) Date of Patent: Oct. 11, 2022

(54) LOW COEFFICIENT OF FRICTION ETHYLENE-BASED COMPOSITIONS

(71) Applicant: Dow Global Technologies LLC, Midland, MI (US)

(72) Inventors: Rahul Sharma, Lake Jackson, TX (US); Jong-Young Lee, Lake Jackson, TX (US); Jeffrey D. Weinhold, Lake Jackson, TX (US); Mridula Babli Kapur, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 415 days.

(21) Appl. No.: 16/619,852

(22) PCT Filed: Jun. 4, 2018

(86) PCT No.: PCT/US2018/035846
§ 371 (c)(1),
(2) Date: Dec. 5, 2019

(87) PCT Pub. No.: WO2018/226582
PCT Pub. Date: Dec. 13, 2018

(65) Prior Publication Data
US 2020/0131351 A1 Apr. 30, 2020

Related U.S. Application Data

(60) Provisional application No. 62/517,278, filed on Jun. 9, 2017.

(51) Int. Cl.
| | | |
|---|---|---|
| *C08K 5/20* | (2006.01) | |
| *B32B 27/32* | (2006.01) | |
| *B32B 15/06* | (2006.01) | |
| *B32B 15/09* | (2006.01) | |
| *B32B 15/12* | (2006.01) | |
| *B32B 25/06* | (2006.01) | |
| *B32B 25/08* | (2006.01) | |
| *B32B 25/16* | (2006.01) | |
| *B32B 27/06* | (2006.01) | |
| *B32B 27/20* | (2006.01) | |
| *B32B 27/22* | (2006.01) | |
| *B32B 27/34* | (2006.01) | |
| *B32B 27/36* | (2006.01) | |
| *B32B 27/08* | (2006.01) | |
| *C08L 23/08* | (2006.01) | |

(52) U.S. Cl.
CPC .......... *C08L 23/0815* (2013.01); *B32B 27/32* (2013.01); *C08K 5/20* (2013.01); *B32B 2307/538* (2013.01); *C08L 2203/16* (2013.01); *C08L 2205/025* (2013.01); *C08L 2207/062* (2013.01); *C08L 2207/064* (2013.01)

(58) Field of Classification Search
None
See application file for complete search history.

(56) References Cited

U.S. PATENT DOCUMENTS

| | | | |
|---|---|---|---|
| 5,250,612 A * | 10/1993 | Hazlitt | C08F 297/08 |
| | | | 525/320 |
| 5,677,383 A | 10/1997 | Chum et al. | |
| 6,111,023 A | 6/2000 | Chum et al. | |
| 6,984,695 B2 | 1/2006 | Brown et al. | |
| 7,910,658 B2 | 3/2011 | Chang et al. | |
| 8,273,068 B2 | 9/2012 | Chang et al. | |
| 8,721,827 B2 | 5/2014 | Chang et al. | |
| 9,029,447 B2 | 5/2015 | Martinelli et al. | |
| 2005/0187352 A1 † | 8/2005 | Chum | |
| 2007/0093603 A1 * | 4/2007 | Wooster | B32B 27/32 |
| | | | 525/240 |
| 2007/0155900 A1 | 7/2007 | Chang et al. | |
| 2008/0177242 A1 | 7/2008 | Chang et al. | |
| 2012/0244327 A1 | 9/2012 | Hernandez | |
| 2013/0048204 A1 | 2/2013 | Chang et al. | |
| 2017/0326847 A1 | 11/2017 | Mishra et al. | |

FOREIGN PATENT DOCUMENTS

| | | |
|---|---|---|
| DE | 19603815 A1 | 8/1996 |
| JP | H10-29255 A | 2/1998 |
| WO | 99/52972 A1 | 10/1999 |

OTHER PUBLICATIONS

Janorkar, Amol V., et al. "Effect of Erucamide and Silica Loadings on COF Behavior of POP Multilayer Films in Repetitive Testing." Polymer Engineering and Science, vol. 44, No. 1, pp. 34-44 (Jan. 2004).†

Patel, Rajen, et al. "Surface Haze and Surface Morphology of Blown Film Compositions." J. Plastic Film & Sheeting, vol. 21, No. 1, pp. 217-231 (Jul. 2005).†

\* cited by examiner
† cited by third party

*Primary Examiner* — Sheeba Ahmed
(74) *Attorney, Agent, or Firm* — Quarles & Brady LLP

(57) ABSTRACT

The present disclosure provides a composition containing a polymeric blend. The polymeric blend contains (A) from 50 wt % to 90 wt % of a first ethylene-based polymer having a density from 0.895 g/cc to 0.905 g/cc; and a melt index from 0.1 g/10 min to 50 g/10 min; (B) from 8 wt % to 48 wt % of a second ethylene-based polymer having a density from 0.935 g/cc to 0.967 g/cc; and a melt index from 0.1 g/10 min to 180 g/10 min; and from 0.01 wt % to 2.0 wt % of a slip agent, based on the total weight of the polymeric blend. The polymeric blend has (i) an overall density from 0.900 g/cc to 0.925 g/cc; and (ii) a coefficient of friction (COF) after aging for 1 week at 60° C. from 0.001 to 0.400. The present disclosure also provides a multilayer film with a first layer containing the composition.

20 Claims, No Drawings

LOW COEFFICIENT OF FRICTION ETHYLENE-BASED COMPOSITIONS

BACKGROUND

The present disclosure relates to ethylene-based compositions containing a slip agent, and films containing the same.

Film layers formed from ethylene-based polymers are used in films for food packaging and specialty packaging. An outermost ethylene-based polymer layer requires a low initial coefficient of friction (COF) (e.g., less than 0.25) for efficient processing of the films, such as in a packaging line. To achieve a low initial COF, slip agents are typically added to the ethylene-based polymer. However, after exposure to elevated temperatures, such as during transportation and storage, the COF of the ethylene-based polymeric composition containing a slip agent is known to irreversibly increase. Thus, the effectiveness of the slip agent additive decreases with exposure to elevated temperatures.

The art recognizes the need for an ethylene-based polymeric composition that exhibits a low initial COF (e.g., less than 0.40) and a low COF (e.g., less than 0.40) after exposure to elevated temperatures. The art also recognizes the need for a film with an outermost layer that includes an ethylene-based polymeric composition that exhibits a low initial COF (e.g., less than 0.40) and a low COF (e.g., less than 0.40) after exposure to elevated temperatures.

SUMMARY

The present disclosure provides a composition containing:
a polymeric blend containing
(A) from 50 wt % to 90 wt % of a first ethylene-based polymer having a density from 0.895 g/cc to 0.905 g/cc; and a melt index from 0.1 g/10 min to 50 g/10 min;
(B) from 8 wt % to 48 wt % of a second ethylene-based polymer having a density from 0.935 g/cc to 0.967 g/cc; and a melt index from 0.1 g/10 min to 180 g/10 min;
(C) from 0.01 wt % to 2.0 wt % of a slip agent, based on the total weight of the polymeric blend;
the polymeric blend having (i) an overall density from 0.900 g/cc to 0.925 g/cc; and (ii) a coefficient of friction (COF) after aging for 1 week at 60° C. from 0.001 to 0.400.

The present disclosure also provides a multilayer film with a first layer containing the composition.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 mole percent polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include ultra low density polyethylene (ULDPE), very low density polyethylene (VLDPE), multi-component ethylene-based copolymer (EPE), ethylene/α-olefin multi-block copolymers (also known as olefin block copolymer (OBC)), ethylene plastomers/elastomers, medium density polyethylene (MDPE), and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one C3-C10 α-olefin comonomer, or at least one C4-C8 α-olefin comonomer, or at least one C6-C8 α-olefin comonomer. Ethylene plastomers/elastomers have a density from 0.870 g/cc, or 0.880 g/cc, or 0.890 g/cc to 0.900 g/cc, or 0.902 g/cc, or 0.904 g/cc, or 0.909 g/cc, or 0.910 g/cc, or 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one C4-C10 α-olefin comonomer, or C4 α-olefin comonomer and a density from greater than 0.94 g/cc, or 0.945 g/cc, or 0.95 g/cc, or 0.955 g/cc to 0.96 g/cc, or 0.97 g/cc, or 0.98 g/cc. The HDPE can be a monomodal copolymer or a multimodal copolymer. A "monomodal ethylene copolymer" is an ethylene/$C_4$-$C_{10}$α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

"Medium density polyethylene" (or "MDPE") is an ethylene homopolymer, or an ethylene/α-olefin copolymer comprising at least one $C_3$-$C_{10}$ α-olefin, or a $C_3$-$C_4$α-olefin, that has a density from 0.926 g/cc to 0.940 g/cc. Nonlimiting examples of suitable MDPE include AXELERON™ FO 6548 BK CPD, AXELERON™ FO 6549 NT CPD, AXELERON™ FO 8864 NT CPD, and AXELERON™ FO 8864 BK CPD, each available from The Dow Chemical Company.

"Multi-component ethylene-based copolymer" (or "EPE") comprises units derived from ethylene and units derived from at least one C3-C10 α-olefin comonomer, or at least one C4-C8 α-olefin comonomer, or at least one C6-C8 α-olefin comonomer, such as described in patent references U.S. Pat. Nos. 6,111,023; 5,677,383; and 6,984,695. EPE resins have a density from 0.905 g/cc, or 0.908 g/cc, or 0.912 g/cc, or 0.920 g/cc to 0.926 g/cc, or 0.929 g/cc, or 0.940 g/cc, or 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer, or at least one $C_4$-$C_8$ α-olefin comonomer, or at least one $C_6$-$C_8$ α-olefin comonomer. ULDPE and VLDPE each has a density from 0.885 g/cc, or 0.90 g/cc to 0.915 g/cc. Nonlimiting examples of ULDPE and VLDPE include ATTANE™ ultra low density polyethylene resins (available form The Dow Chemical Company) and FLEXOMER™ very low density polyethylene resins (available from The Dow Chemical Company).

Test Methods

Light Transmission is measured in accordance with ASTM D1746.

Coefficient of Friction (COF) is measured according to ASTM D1894. The substrate employed for COF determinations is stainless steel. Film is produced as a roll, and cut into 3.5 in×3.5 in (8.89 cm×8.89 cm) specimen pieces for COF testing. The "initial COF" is measured after the film roll is stored for 1 week at ambient conditions (<25° C., 101.325 kPa, <60% relative humidity), and specimens are cut from the roll. A separate set of film specimens are cut from the roll and aged for 1 week at 60° C. (101.325 kPa, <60% relative humidity), cooled for 1 day at ambient conditions, and the "60° C. aged COF" is measured. For initial COF and 60° C. aged COF, kinetic film-to-metal COF is measured on a TMI COF Tester, Model 32-06-00-0002, with standard testing conditions (23° C. (±2° C.) and 50% (±10%) relative humidity). A B-type sled is used, the sled being 2.5 in×2.5 in (6.35 cm×6.35 cm) and weighing 200 grams. The specimen piece is placed on the bottom of the sled such that the side of interest is facing out, and with the machine direction (MD) parallel to the direction of movement. The specimen piece is attached to the sled on the forward and backward edges of the sled using double-sided tape, ensuring there are no wrinkles on the specimen piece. The sled is then placed specimen-piece face down on the testing frame and attached to a travel arm that contains a load cell (which measures frictional force). The sled is moved over the substrate at a speed of 6 in/minute (15.24 cm/min) for a distance of 3 inches (7.62 cm). The average load over the 3 inches (7.62 cm) of movement is the kinetic force ($F_k$). The coefficient of kinetic friction ($\mu_K$) (COF) is the ratio of the kinetic force ($F_k$) to the normal force (W), wherein the normal force (W) is the weight of the sled (200 g). Five replicate samples are tested, and the average value is reported.

Density is measured in accordance with ASTM D792, Method B. The result is recorded in g/cc.

Haze is measured in accordance with ASTM D1003.

The "heat seal initiation temperature" (HSIT) is the minimum sealing temperature required to form a heat seal of a significant strength, in this case, the temperature at which the average maximum seal force reached 13.34 Newtons (N). HSIT is measured according to ASTM F88. Specimens are heat sealed across the machine direction on a Kopp™ Heat Sealer over a range of temperatures under the following conditions: Sealing Pressure=0.275 N/mm$^2$; Sealing Dwell Time=0.5 seconds; Depth of Seal=5 mm. The sealed specimens are conditioned for a minimum of 3 hours at 23° C. (±2° C.) and 50% (±10%) relative humidity and cut into 2.54 cm (1 inch) wide strips. The cut specimens are conditioned for a minimum of 24 hours after sealing and cutting at 23° C. (±2° C.) and 50% (±10%) relative humidity prior to HSIT testing. The sealed specimen is tested in an INSTRON® Tensiomer at 10 in/min (4.2 mm/sec or 250 mm/min) at 23° C. (±2° C.) and 50% (±10%) relative humidity.

Melt index (MI) (12) in g/10 min is measured according to ASTM D-1238-04 (190° C./2.16 kg).

Melt temperature, or "T," as used herein (also referred to as a melting peak in reference to the shape of the plotted DSC curve) is typically measured by the DSC (Differential Scanning calorimetry) technique for measuring the melting points or peaks of polyolefins, as described in U.S. Pat. No. 5,783,638. It should be noted that many blends comprising two or more polyolefins will have more than one melting point or peak, many individual polyolefins will comprise only one melting point or peak.

Surface roughness (SR) is measured by atomic force microscopy (AFM). The samples are mounted on a stage using double-sided carbon tape and then blown-cleaned with Duster. AFM images are captured at ambient temperature by using a Veeco™ (now Bruker™) Icon AFM system with a Mikromasch™ probe. The probe has a spring constant of 40 N/m and a resonant frequency in the vicinity of 170 kHz. An imaging frequency of 0.5 Hz is used with a set point ratio of ~0.8. For each sample, at least five 40×40 µm$^2$ images are collected for surface roughness analysis. The images are processed with SPIP software version 6.6 and a L-filter of 10 µm is applied. The surface roughness is quantified as the geometric deviation of all points on the surface from the mean value of the data. Surface roughness is measured in nanometers (nm). The "initial SR" is measured on a specimen taken from the film roll after it has been stored for at least 1 week at ambient conditions (<25° C., 101.325 kPa, <60% relative humidity). Then, another specimen from the film roll is aged for 1 week at 60° C. (101.325 kPa, <60% relative humidity), cooled for at least 1 day at ambient conditions (<25° C., 101.325 kPa, <60% relative humidity), and the "60° C. aged SR" is measured.

DETAILED DESCRIPTION

The present disclosure provides a composition. In an embodiment, the composition includes a polymeric blend containing (A) from 50 wt % to 90 wt % of a first ethylene-based polymer having a density from 0.895 g/cc to 0.905 g/cc, and a melt index from 0.1 g/10 min to 50 g/10 min; (B) from 8 wt % to 48 wt % of a second ethylene-based polymer having a density from 0.935 g/cc to 0.967 g/cc, and a melt index from 0.1 g/10 min to 180 g/10 min; and (C) from 0.01 wt % to 2.0 wt % of a slip agent, based on the total weight of the polymeric blend. The polymeric blend has (i) an overall density from 0.900 g/cc to 0.925 g/cc and (ii) a coefficient of friction (COF) after aging for 1 week at 60° C. from 0.001 to 0.400.

A. First Ethylene-Based Polymer

The polymeric blend contains a first ethylene-based polymer. The first ethylene-based polymer has a density from 0.895 g/cc to 0.905 g/cc, and a melt index from 0.1 g/10 min to 50 g/10 min.

Nonlimiting examples of suitable first ethylene-based polymer (polyethylene) include ethylene-based plastomers/elastomers, multi-component ethylene-based copolymer (EPE), ultra low density polyethylene (ULDPE), very low density polyethylene (VLDPE), and combinations thereof. In an embodiment, the first ethylene-based polymer is an ethylene-based plastomer/elastomer. In another embodiment, the first ethylene-based polymer is an ethylene-based plastomer/elastomer that is an ethylene/$C_3$-$C_{10}$ α-olefin copolymer, or an ethylene/$C_4$-$C_8$ α-olefin copolymer, or an ethylene/$C_6$-$C_8$ α-olefin copolymer, or an ethylene/octene copolymer.

In an embodiment, the first ethylene-based polymer includes from greater than 50 wt %, or 55 wt %, or 60 wt %, or 65 wt % to 70 wt %, or 75 wt %, or 80 wt %, or 85 wt %, or 90 wt %, or 95 wt %, or 97 wt %, or 99 wt %, or 100 wt % units derived from ethylene and a reciprocal amount, or from 0 wt %, or 1 wt %, or 3 wt %, or 5 wt %, or 10 wt %, or 15 wt %, or 20 wt %, or 25 wt %, or 30 wt % to 35 wt %, or 40 wt %, or 45 wt %, or less than 50 wt % units derived from a comonomer, based on the total weight of the first ethylene-based polymer.

In an embodiment, the first ethylene-based polymer has a density from 0.895 g/cc, or 0.894 g/cc, or 0.897 g/cc to 0.902 g/cc, or 0.903 g/cc, or 0.904 g/cc, or 0.905 g/cc.

In an embodiment, the first ethylene-based polymer has a melt index from 0.1 g/10 min, or 0.5 g/10 min, or 1.0 g/10 min to 2.0 g/10 min, or 3.0 g/10 min, or 5.0 g/10 min, or 10.0 g/10 min, or 15 g/10 min, or 20 g/10 min, or 25 g/10 min, or 30 g/10 min, or 35 g/10 min, or 40 g/10 min, or 45 g/10 min, or 50 g/10 min.

In an embodiment, the first ethylene-based polymer has a melting temperature ($T_m$) from greater than 60° C., or 65° C., or 70° C., or 75° C., or 80° C., or 85° C., or 90° C., or 95° C. to 100° C., or 105° C., or 110° C., or 120° C.

In an embodiment, the first ethylene-based polymer has:
(i) a density from 0.895 g/cc, or 0.894 g/cc, or 0.897 g/cc to 0.902 g/cc, or 0.903 g/cc, or 0.904 g/cc, or 0.905 g/cc; and
(ii) a melt index from 0.1 g/10 min, or 0.5 g/10 min, or 1.0 g/10 min to 2.0 g/10 min, or 3.0 g/10 min, or 5.0 g/10 min, or 10.0 g/10 min.

In an embodiment, the first ethylene-based polymer is an ethylene-based plastomer/elastomer that is an ethylene/$C_3$-$C_{10}$ α-olefin copolymer, or an ethylene/$C_4$-$C_8$ α-olefin copolymer, or an ethylene/$C_6$-$C_8$ α-olefin copolymer, or an ethylene/octene copolymer, and the first ethylene-based polymer has:
(i) a density from 0.895 g/cc, or 0.894 g/cc, or 0.897 g/cc to 0.902 g/cc, or 0.903 g/cc, or 0.904 g/cc, or 0.905 g/cc; and
(ii) a melt index from 0.1 g/10 min, or 0.5 g/10 min, or 1.0 g/10 min to 2.0 g/10 min, or 3.0 g/10 min, or 5.0 g/10 min, or 10.0 g/10 min.

In a further embodiment, the ethylene-based plastomer/elastomer has one or both of the following properties:

(iv) a melting temperature (Tm) from 80° C., or 85° C., or 90° C., or 95° C. to 100° C., or 105° C., or 110° C., or 120° C.; and/or (v) from greater than 50 wt %, or 55 wt %, or 60 wt %, or 65 wt % to 70 wt %, or 75 wt %, or 80 wt %, or 85 wt %, or 90 wt %, or 95 wt %, or 97 wt %, or 99 wt %, or 100 wt % units derived from ethylene and a reciprocal amount, or from 0 wt %, or 1 wt %, or 3 wt %, or 5 wt %, or 10 wt %, or 15 wt %, or 20 wt %, or 25 wt %, or 30 wt % to 35 wt %, or 40 wt %, or 45 wt %, or less than 50 wt % units derived from a comonomer, based on the total weight of the first ethylene-based polymer.

In an embodiment, the first ethylene-based polymer is an ethylene/octene copolymer with a density of 0.902 g/cc; a melt index of 1.0 g/10 min; and a melting temperature (Tm) of 99° C. In a further embodiment, the ethylene-based polymer is AFFINITY™ PL 1880G, available from The Dow Chemical Company.

In an embodiment, the first ethylene-based polymer is an ethylene/octene copolymer with a density of 0.897 g/cc; a melt index of 1.6 g/10 min; and a melting temperature (Tm) of 96.1° C. In a further embodiment, the ethylene-based polymer is AFFINITY™ PF 1140G, available from The Dow Chemical Company.

In an embodiment, the polymeric blend contains from 50 wt %, or 55 wt %, or 60 wt %, or 65 wt %, or 70 wt %, or 75 wt % to 80 wt %, or 85 wt %, or 90 wt % of the first ethylene-based polymer, based on the total weight of the polymeric blend.

In an embodiment, the composition contains from 50 wt %, or 55 wt %, or 60 wt %, or 65 wt %, or 70 wt %, or 75 wt % to 80 wt %, or 85 wt %, or 90 wt % of the first ethylene-based polymer, based on the total weight of the composition.

The first ethylene-based polymer may comprise two or more embodiments disclosed herein.

B. Second Ethylene-Based Polymer

The polymeric blend contains a second ethylene-based polymer. The second ethylene-based polymer has a density from 0.935 g/cc to 0.967 g/cc and a melt index from 0.1 g/10 min to 180 g/10 min.

The second ethylene-based polymer is different than the first ethylene-based polymer because the second ethylene-based polymer and the first ethylene-based polymer have different densities. Specifically, the density of the first ethylene-based polymer (0.895-0.905 g/cc) is less than the density of the second ethylene-based polymer (0.935-0.967 g/cc).

Nonlimiting examples of suitable second ethylene-based polymer (polyethylene) include high density polyethylene (HDPE), medium density polyethylene (MDPE), multi-component ethylene-based copolymer (EPE), and combinations thereof. In another embodiment, the second ethylene-based polymer is an ethylene/$C_3$-$C_{10}$ α-olefin copolymer, or an ethylene/$C_4$-$C_8$ α-olefin copolymer, or an ethylene/$C_6$-$C_8$ α-olefin copolymer, or an ethylene/octene copolymer.

In an embodiment, the second ethylene-based polymer includes from greater than 50 wt %, or 55 wt %, or 60 wt %, or 65 wt % to 70 wt %, or 75 wt %, or 80 wt %, or 85 wt %, or 90 wt %, or 95 wt %, or 97 wt %, or 99 wt %, or 100 wt % units derived from ethylene and a reciprocal amount, or from 0 wt %, or 1 wt %, or 3 wt %, or 5 wt %, or 10 wt %, or 15 wt %, or 20 wt %, or 25 wt % to 35 wt %, or 40 wt %, or 45 wt %, or less than 50 wt % units derived from a comonomer, based on the total weight of the second ethylene-based polymer.

In an embodiment, the second ethylene-based polymer has a density from 0.935 g/cc, or 0.940 g/cc, 0.941 g/cc, or 0.942 g/cc to 0.950 g/cc, or 0.955 g/cc, or 0.957 g/cc, or 0.958 g/cc, or 0.959 g/cc, or 0.960 g/cc, or 0.965 g/cc, or 0.967 g/cc.

In an embodiment, the second ethylene-based polymer has a melt index from 0.1 g/10 min, or 0.5 g/10 min, or 1.0 g/10 min to 2.0 g/10 min, or 5.0 g/10 min, or 10.0 g/10 min, or 15 g/10 min, or 20 g/10 min, or 25 g/10 min, or 30 g/10 min, or 35 g/10 min, or 40 g/10 min, or 45 g/10 min, or 50 g/10 min, or 60 g/10 min, or 70 g/10 min, or 80 g/10 min, or 90 g/10 min, or 100 g/10 min, or 110 g/10 min, or 120 g/10 min, or 130 g/10 min, or 140 g/10 min, or 150 g/10 min, or 160 g/10 min, or 170 g/10 min, or 180 g/10 min.

In an embodiment, the second ethylene-based polymer has a melting temperature ($T_m$) from 100° C., or 105° C., or 110° C., or 115° C., or 117° C., or 120° C. to 125° C., or 130° C., or 134° C., or 135° C., or 140° C., or 150° C., or 160° C., or 165° C.

In an embodiment, the second ethylene-based polymer has:

(i) a density from 0.935 g/cc, or 0.940 g/cc, 0.941 g/cc, or 0.942 g/cc to 0.950 g/cc, or 0.955 g/cc, or 0.957 g/cc, or 0.958 g/cc, or 0.959 g/cc, or 0.960 g/cc, or 0.965 g/cc, or 0.967 g/cc; and (ii) a melt index from 0.1 g/10 min, or 0.5 g/10 min, or 1.0 g/10 min to 2.0 g/10 min, or 5.0 g/10 min, or 10.0 g/10 min, or 15 g/10 min, or 20 g/10 min, or 25 g/10 min, or 30 g/10 min, or 35 g/10 min, or 40 g/10 min, or 45 g/10 min, or 50 g/10 min, or 60 g/10 min, or 70 g/10 min, or 80 g/10 min, or 90 g/10 min, or 100 g/10 min, or 110 g/10 min, or 120 g/10 min, or 130 g/10 min, or 140 g/10 min, or 150 g/10 min, or 160 g/10 min.

In an embodiment, the second ethylene-based polymer is an ethylene/$C_3$-$C_{10}$ α-olefin copolymer, or an ethylene/$C_4$-$C_8$ α-olefin copolymer, or an ethylene/$C_6$-$C_8$ α-olefin copolymer, or an ethylene/octene copolymer, and the second ethylene-based polymer has:

(i) a density from 0. 0.935 g/cc, or 0.940 g/cc, 0.941 g/cc, or 0.942 g/cc to 0.950 g/cc, or 0.955 g/cc, or 0.957 g/cc, or 0.958 g/cc, or 0.959 g/cc, or 0.960 g/cc, or 0.965 g/cc, or 0.967 g/cc; and (ii) a melt index from 0.1 g/10 min, or 0.5 g/10 min, or 1.0 g/10 min to 2.0 g/10 min, or 5.0 g/10 min, or 10.0 g/10 min, or 15 g/10 min, or 20 g/10 min, or 25 g/10 min, or 30 g/10 min, or 35 g/10 min, or 40 g/10 min, or 45 g/10 min, or 50 g/10 min, or 60 g/10 min, or 70 g/10 min, or 80 g/10 min, or 90 g/10 min, or 100 g/10 min, or 110 g/10 min, or 120 g/10 min, or 130 g/10 min, or 140 g/10 min, or 150 g/10 min, or 160 g/10 min.

In a further embodiment, the second ethylene-based polymer has one or both of the following properties:

(iv) a melting temperature (Tm) from 110° C., or 115° C., or 117° C., or 120° C. to 125° C., or 130° C., or 134° C., or 135° C., or 140° C., or 150° C., or 160° C., or 165° C.; and/or (iv) from greater than 50 wt %, or 55 wt %, or 60 wt %, or 65 wt % to 70 wt %, or 75 wt %, or 80 wt %, or 85 wt %, or 90 wt %, or 95 wt %, or 97 wt %, or 99 wt %, or 100 wt % units derived from ethylene and a reciprocal amount, or from 0 wt %, or 1 wt %, or 3 wt %, or 5 wt %, or 10 wt %, or 15 wt %, or 20 wt %, or 25 wt %, or 30 wt % to 35 wt %, or 40 wt %, or 45 wt %, or less than 50 wt % units derived from a comonomer, based on the total weight of the second ethylene-based polymer.

In an embodiment, the polymeric blend contains from 8 wt %, or 10 wt %, or 15 wt % to 20 wt %, or 25 wt %, or 30 wt %, or 35 wt %, or 40 wt %, or 45 wt %, or 48 wt % of the second ethylene-based polymer, based on the total weight of the polymeric blend.

In an embodiment, the composition contains from 8 wt %, or 10 wt %, or 15 wt % to 20 wt %, or 25 wt %, or 30 wt %, or 35 wt %, or 40 wt %, or 45 wt %, or 48 wt % of the second ethylene-based polymer, based on the total weight of the composition.

The second ethylene-based polymer may comprise two or more embodiments disclosed herein.

C. Slip Agent

The polymeric blend contains a slip agent. A "slip agent" is an additive that reduces the coefficient of friction (COF) of a blend, of a composition, or of a layer.

Nonlimiting examples of suitable slip agents include fatty acid amides, silicone, plasticizers, organic amines, dibasic esters, stearates, sulfates, fatty acids, mineral oil, vegetable oils, fluorinated organic resins, graphite, tungsten disulfide, molybdenum disulfide, and combinations thereof.

In an embodiment, the slip agent is a fatty acid amide. A "fatty acid amide" is a molecule having the Structure (I):

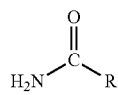

Structure (I)

wherein R is a $C_3$ to $C_{27}$ alkyl moiety. In an embodiment, R is a $C_{11}$ to $C_{25}$, or a $C_{15}$ to $C_{23}$ alkyl moiety. In another embodiment, R is a $C_{21}$ alkyl moiety. R can be saturated, mono-unsaturated, or poly-unsaturated. In an embodiment, R is mono-unsaturated. Nonlimiting examples of suitable fatty acid amides include erucamide, oleamide, palmitamide, stearamide, and behenamide. Additionally, the fatty acid amide can be a mixture of two or more fatty acid amides. In an embodiment, the fatty acid amide is erucamide.

In an embodiment, the slip agent is a silicone. A "silicone" is a polymer generally comprising siloxane-based monomer residue repeating units. A "siloxane" is a monomer residue repeat unit having the Structure (II):

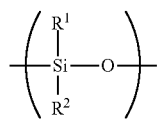

Structure (II)

wherein $R^1$ and $R^2$ each independently is hydrogen or a hydrocarbyl group. A "hydrocarbyl group" is a univalent group formed by removing a hydrogen atom from a hydrocarbon (e.g., alkyl groups, such as ethyl, or aryl groups, such as phenyl). The siloxane monomer residue can be any dialkyl, diaryl, dialkaryl, or diaralkyl siloxane, having the same or differing alkyl, aryl, alkaryl, or aralkyl moieties. In an embodiment, each of $R^1$ and $R^2$ is independently a $C_1$ to $C_{20}$, or $C_1$ to $C_{12}$, or $C_1$ to $C_6$ alkyl, aryl, alkaryl, or aralkyl moiety. $R^1$ and $R^2$ can have the same or a different number of carbon atoms. In an embodiment, the hydrocarbyl group for each of $R^1$ and $R^2$ is an alkyl group that is saturated and optionally straight-chain. The alkyl group can be the same or can be different for each of $R^1$ and $R^2$. Non-limiting examples of alkyl groups suitable for use in $R^1$ and $R^2$ include methyl, ethyl, 1-propyl, 2-propyl, 1-butyl, isobutyl, t-butyl, or combinations of two or more thereof. Nonlimiting examples of suitable silicone include polydimethylsiloxane (PDMS), poly(ethyl-methylsiloxane), and combinations thereof.

In another embodiment, the slip agent excludes silicones. In a further embodiment, the slip agent excludes PDMS.

In an embodiment, the slip agent is a stearate. Nonlimiting examples of suitable stearates include zinc stearate, lead stearate, calcium stearate, and combinations thereof.

In an embodiment, the slip agent is a sulfate. A nonlimiting example of a suitable sulfate is zinc sulfate.

In an embodiment, the slip agent is a fatty acid. Nonlimiting examples of suitable fatty acids include palmitic acid, stearic acid, and combinations thereof.

In an embodiment, the slip agent is a fluorinated organic resin. A "fluorinated organic resin" is a polymer of one or more fluorinated monomers selected from tetrafloroethylene, vinylidene fluoride, and chlorotrifluoroethylene.

In an embodiment, the polymeric blend contains from 100 ppm, or 150 ppm, or 200 ppm, or 250 ppm, or 500 ppm to 1000 ppm, or 1500 ppm, or 2000 ppm, or 2500 ppm slip agent.

In an embodiment, the composition contains from 100 ppm, or 150 ppm, or 200 ppm, or 250, or 500 ppm to 1000 ppm, or 1500 ppm, or 2000 ppm, or 2500 ppm slip agent.

In an embodiment, the polymeric blend contains 0.01 wt %, or 0.02 wt %, or 0.05 wt % to 0.1 wt %, or 0.15 wt %, or 0.20 wt %, or 0.25 wt %, or 0.50 wt %, or 1.0 wt %, or 1.5 wt %, or 2.0 wt % slip agent, based on the total weight of the polymeric blend.

In an embodiment, the composition contains from 0.01 wt %, or 0.02 wt %, or 0.05 wt % to 0.1 wt %, or 0.15 wt %, or 0.20 wt %, or 0.25 wt %, or 0.50 wt %, or 1.0 wt %, or 1.5 wt %, or 2.0 wt % slip agent, based on the total weight of the composition.

The slip agent may comprise two or more embodiments disclosed herein.

D. Optional Additives

In an embodiment, the polymeric blend includes an optional additive. Nonlimiting examples of suitable additives include antioxidants, anti-blocking agents, stabilizing agents, colorants, ultra violet (UV) absorbers or stabilizers, flame retardants, compatibilizers, plasticizers, fillers, processing aids, and combinations thereof.

In an embodiment, the polymeric blend includes an antioxidant. Nonlimiting examples of suitable antioxidants include phenolic antioxidants, thio-based antioxidants, phosphate-based antioxidants, and hydrazine-based metal deactivators. In a further embodiment, the polymeric blend includes an antioxidant, such as IRGANOX 1035, present in an amount from 0.1 wt %, or 0.2 wt % to 0.3 wt %, based on the total weight of the polymeric blend. In a further embodiment, the composition includes an antioxidant in an amount from 0.1 wt %, or 0.2 wt % to 0.3 wt %, based on the total weight of the composition.

In an embodiment, the polymeric blend includes a stabilizing agent. Nonlimiting examples of suitable stabilizing agents include polyethylene glycol, ethylene glycol-propylene glycol block copolymers, molecules (including polymers) containing one or more hydroxyl groups, molecules (including polymers) containing one or more carboxylic acid groups, molecules (including polymers) containing one or more ester groups, and combinations thereof. In a further embodiment, the polymeric blend includes a stabilizing agent, such as polyethylene glycol, present in an amount from 0.1 wt %, or 0.2 wt % to 0.3 wt %, or 1 wt %, or 3.0 wt %, or 5 wt %, based on the total weight of the polymeric blend. In a further embodiment, the composition includes a stabilizing agent in an amount from 0.1 wt %, or 0.2 wt % to 0.3 wt %, or 1 wt %, or 3.0 wt %, or 5 wt %, based on the total weight of the composition.

The additive may comprise two or more embodiments disclosed herein.

E. Composition

The composition includes a polymeric blend containing (A) from 50 wt % to 90 wt % of a first ethylene-based polymer having a density from 0.895 g/cc to 0.905 g/cc, and a melt index from 0.1 g/10 min to 50 g/10 min; (B) from 8 wt % to 48 wt % of a second ethylene-based polymer having a density from 0.935 g/cc to 0.967 g/cc, and a melt index from 0.1 g/10 min to 180 g/10 min; (C) from 0.01 wt % to 2.0 wt % of a slip agent, based on the total weight of the polymeric blend; and, optionally, (D) an additive. The polymeric blend has (i) an overall density from 0.900 g/cc to 0.925 g/cc and (ii) a coefficient of friction (COF) after aging for 1 week at 60° C. from 0.001 to 0.400.

In an embodiment, the composition includes a polymeric blend consisting essentially of, or consisting of (A) the first ethylene-based polymer; (B) the second ethylene-based polymer; (C) the slip agent; and, optionally, (D) an additive.

In an embodiment, the polymeric blend has an overall density from 0.900 g/cc, or 0.905 g/cc, or 0.908 g/cc to 0.910 g/cc, or 0.915 g/cc, or 09.20 g/cc, or 0.925 g/cc.

In an embodiment, the polymeric blend has an overall melt index from 0.1 g/10 min, or 0.5 g/10 min to 3 g/10 min, or 5 g/10 min.

In an embodiment, the polymeric blend has an initial COF from 0.001, or 0.050, or 0.090 to 0.100, or 0.110, or 0.140, or 0.150, or 0.152, or 0.160, or 0.170, or 0.180, or 0.190, or 0.200.

In an embodiment, the polymeric blend has a COF after aging for 1 week at 60° C. from 0.001, or 0.050, or 0.100 to 0.250, or 0.300, or 0.330, or 0.360, or 0.397, or 0.398, or 0.399, or 0.400.

In an embodiment, the polymeric blend has a Δ Density from 0.039 g/cc, or 0.040 g/cc to 0.061 g/cc, or 0.062 g/cc, or 0.063 g/cc, or 0.064 g/cc, or 0.065 g/cc. The "Δ Density" of the polymeric blend is the difference (in absolute value) between the density of the first ethylene-based polymer and the density of the second ethylene-based polymer, and may be calculated according to Equation (I):

$$\Delta \text{ Density} = |\text{density of first ethylene-based polymer} - \text{density of second ethylene-based polymer}| \quad (I)$$

In an embodiment, the polymeric blend has a Δ melt index from 0 g/10 min to 4 g/10 min, or 15 g/10 min, or 20 g/10 min, or 50 g/10 min, or 100 g/10 min, or 125 g/10 min, or 150 g/10 min, or 152 g/10 min, or 155 g/10 min. The "Δ melt index" or "Δ MI" of the polymeric blend is the difference (in absolute value) between the melt index (MI) (190° C./2.16 kg) of the first ethylene-based polymer and the melt index (MI) (190° C./2.16 kg) of the second ethylene-based polymer, and may be calculated according to Equation (II):

$$\Delta MI = |MI \text{ of first ethylene-based polymer} - MI \text{ of second ethylene-based polymer}| \quad (II)$$

In an embodiment, the polymeric blend contains, consists essentially of, or consists of:
(A) from 50 wt %, or 55 wt %, or 60 wt %, or 65 wt %, or 70 wt %, or 75 wt % to 80 wt %, or 85 wt %, or 90 wt % of the first ethylene-based polymer;
(B) from 8 wt %, or 10 wt %, or 15 wt % to 20 wt %, or 25 wt %, or 30 wt %, or 35 wt %, or 40 wt %, or 45 wt %, or 48 wt % of the second ethylene-based polymer;
(C) from 0.01 wt %, or 0.02 wt %, or 0.05 wt % to 0.1 wt %, or 0.15 wt %, or 0.20 wt %, or 0.25 wt %, or 0.50 wt %, or 1.0 wt %, or 1.5 wt %, or 2.0 wt % slip agent; and
(D) from 0 wt %, or 0.1 wt %, or 0.2 wt % to 0.3 wt %, or 0.5 wt %, or 1.0 wt %, or 2.0 wt %, or 3.0 wt %, or 5.0 wt % additive.

In an embodiment, the polymeric blend contains, consists essentially of, or consists of:
(A) from 50 wt %, or 55 wt %, or 60 wt %, or 65 wt %, or 70 wt %, or 75 wt % to 80 wt %, or 85 wt %, or 90 wt % of the first ethylene-based polymer (such as an ethylene/octene copolymer), and the first ethylene-based polymer has:
(i) a density from 0.895 g/cc, or 0.894 g/cc, or 0.897 g/cc to 0.902 g/cc, or 0.903 g/cc, or 0.904 g/cc, or 0.905 g/cc; and
(ii) a melt index from 0.1 g/10 min, or 0.5 g/10 min, or 1.0 g/10 min to 2.0 g/10 min, or 3.0 g/10 min, or 5.0 g/10 min, or 10.0 g/10 min;
(B) from 8 wt %, or 10 wt %, or 15 wt % to 20 wt %, or 25 wt %, or 30 wt %, or 35 wt %, or 40 wt %, or 45 wt %, or 48 wt % of the second ethylene-based polymer, and the second ethylene-based polymer has one, some, or all of the following properties:
(i) a density from 0. 0.935 g/cc, or 0.940 g/cc, 0.941 g/cc, or 0.942 g/cc to 0.950 g/cc, or 0.955 g/cc, or 0.957 g/cc, or 0.958 g/cc, or 0.959 g/cc, or 0.960 g/cc, or 0.965 g/cc, or 0.967 g/cc; and
(ii) a melt index from 0.1 g/10 min, or 0.5 g/10 min, or 1.0/10 min to 2.0 g/10 min, or 5.0 g/10 min, or 10.0 g/10 min, or 15 g/10 min, or 20 g/10 min, or 25 g/10 min, or 30 g/10 min, or 35 g/10 min, or 40 g/10 min, or 45 g/10 min, or 54/10 min, or 64/10 min, or 70 g/10 min, or 80 g/10 min, or 90 g/10 min, or 100 g/10 min, or 110 g/10 min, or 120 g/10 min, or 130 g/10 min, or 140 g/10 min, or 150 g/10 min, or 160 g/10 min;
(C) from 0.01 wt %, or 0.02 wt %, or 0.05 wt % to 0.1 wt %, or 0.15 wt %, or 0.20 wt %, or 0.25 wt %, or 0.50 wt %, or 1.0 wt %, or 1.5 wt %, or 2.0 wt % slip agent, wherein the slip agent is a fatty acid amide such as erucamide;
(D) from 0 wt %, or 0.1 wt %, or 0.2 wt % to 0.3 wt %, or 0.5 wt %, or 1.0 wt %, or 2.0 wt %, or 3.0 wt %, or 5.0 wt % additive;
and the polymeric blend (and/or the composition) has:
(1) an overall density from 0.900 g/cc, or 0.905 g/cc, or 0.908 g/cc to 0.910 g/cc, or 0.915 g/cc, or 09.20 g/cc, or 0.925 g/cc; and
(2) a COF after aging for 1 week at 60° C. from 0.001, or 0.050, or 0.100 to 0.250, or 0.300, or 0.330, or 0.360, or 0.397, or 0.398, or 0.399, or 0.400.

In a further embodiment, the polymeric blend (and/or the composition) has one, some, or all of the following properties:
(3) an initial COF from 0.001, or 0.050, or 0.090 to 0.100, or 0.110, or 0.140, or 0.150, or 0.152, or 0.160, or 0.170, or 0.180, or 0.190, or 0.200; and/or
(4) a Δ Density from 0.039 g/cc, or 0.040 g/cc to 0.061 g/cc, or 0.062 g/cc, or 0.063 g/cc, or 0.064 g/cc, or 0.065 g/cc; and/or (5) Δ MI from 0 g/10 min to 4 g/10 min, or 15 g/10 min, or 20 g/10 min, or 50 g/10 min, or 100 g/10 min, or 125 g/10 min, or 150 g/10 min, or 152 g/10 min, or 155 g/10 min.

In an embodiment, the polymeric blend and/or the composition has at least 3, or at least 4, or all 5 of properties (1)-(5).

It is understood that the sum of the components in each of the polymeric blends, compositions, and layers disclosed herein, including the foregoing polymeric blends, yields 100 weight percent (wt %).

In an embodiment, the first ethylene-based polymer is an ethylene/octene copolymer having a density from 0.895 g/cc to 0.905 g/cc, and the second ethylene-based polymer is an ethylene/octene copolymer having a density from 0.935 g/cc to 0.967 g/cc. In a further embodiment, the first ethylene/octene copolymer has a density from 0.897 g/cc to 0.902 g/cc, and the second ethylene/octene copolymer has a density from 0.942 g/cc to 0.958 g/cc, or 0.960 g/cc. In another embodiment, the slip agent is a fatty acid amide, such as erucamide.

In an embodiment, the polymeric blend and/or the composition excludes propylene-based polymers.

In an embodiment, the polymeric blend and/or the composition excludes silicones. In a further embodiment, the polymeric blend and/or the composition excludes PDMS. PDMS is known to increase the haze of ethylene-based compositions.

The polymeric blend may comprise two or more embodiments disclosed herein.

The composition may comprise two or more embodiments disclosed herein.

F. Film

The present disclosure also provides a film. The film includes a layer containing the present composition. The composition for the film layer includes the polymeric blend containing (A) from 50 wt % to 90 wt % of a first ethylene-based polymer having a density from 0.895 g/cc to 0.905 g/cc, and a melt index from 0.1 g/10 min to 50 g/10 min; (B) from 8 wt % to 48 wt % of a second ethylene-based polymer having a density from 0.935 g/cc to 0.967 g/cc, and a melt index from 0.1 g/10 min to 180 g/10 min; (C) from 0.01 wt % to 2.0 wt % of a slip agent, based on the total weight of the polymeric blend. The polymeric blend has (i) an overall density from 0.900 g/cc to 0.925 g/cc and (ii) a COF after aging for 1 week at 60° C. from 0.001 to 0.400. The polymeric blend may be any polymeric blend disclosed herein. The composition may be any composition disclosed herein.

The film may be a monolayer film or a multilayer film. A "monolayer film" contains one and only one layer. A "multilayer film" contains two layers, or more than two layers. For example, the multilayer film can have three, four, five, six, seven, eight, nine, ten, eleven, or more layers. In an embodiment, the film is a multilayer film with two layers.

In an embodiment, the film is a multilayer film with a first layer containing the composition including the polymeric blend.

The first layer has two opposing surfaces. In an embodiment, the first layer is a continuous layer with two opposing surfaces.

In an embodiment, the first layer containing the present composition including the polymeric blend has an initial COF from 0.001, or 0.050, or 0.090 to 0.100, or 0.110, or 0.140, or 0.150, or 0.152, or 0.160, or 0.170, or 0.180, or 0.190, or 0.200, or 0.250, or 0.300, or 0.350, or 0.400.

In an embodiment, the first layer containing the present composition including the polymeric blend has a COF after aging for 1 week at 60° C. from 0.001, or 0.050, or 0.100 to 0.250, or 0.300, or 0.330, or 0.360, or 0.397, or 0.398, or 0.399, or 0.400.

In an embodiment, the first layer containing the present composition including the polymeric blend and/or the film has a light transmission from 90%, or 92% to 94%, or 95%, or 99%, or 100%.

In an embodiment, the first layer containing the present composition including the polymeric blend and/or the film has a haze from 0.5%, or 1.0% to 2.0%, or 2.5%, or 3.0%, or 3.5%, or 4.0%, or 4.5%, or 5.0%, or 5.5%, or 6.0%, or 10%, or 15%, or 20%, or 25%, or 30%.

In an embodiment, the first layer containing the present composition including the polymeric blend has an initial surface roughness from 10 nm, or 13 nm, or 15 nm, or 20 nm to 25 nm, or 29 nm, or 30 nm, or 35 nm, or 40 nm.

In an embodiment, the first layer containing the present composition including the polymeric blend has a surface roughness after aging for 1 week at 60° C. from 10 nm, or 13 nm, or 15 nm, or 20 nm, or 22 nm to 25 nm, or 29 nm, or 30 nm, or 35 nm, or 40 nm, or 45 nm.

Not wishing to be bound by any particular theory, Applicants believe the combination of the lower-density first ethylene-based polymer (0.895-0.905 g/cc) with the higher-density second ethylene-based polymer (0.935-0.967 g/cc) increases the surface roughness of a layer containing the polymeric blend, which minimizes the surface contact area between two films and results in lower COF.

In an embodiment, the first layer containing the present composition including the polymeric blend has a heat seal initiation temperature (HSIT) from 65° C., or 70° C., or 75° C., or 80° C. to 84° C., or 85° C., or 90° C., or 95° C., or 100° C. A low HSIT (100° C.) is advantageous for the production process of articles formed from the film because a heat seal may be formed at a lower temperature.

In an embodiment, the first layer containing the present composition including the polymeric blend has a thickness from 5 μm, or 10 μm, or 15 μm, or 20 μm, or 25 μm to 30 μm, or 40 μm, or 50 μm, or 55 μm.

In an embodiment, the film, and further the multilayer film, has a first layer containing a composition including a polymeric blend, the polymeric blend containing, consisting essentially of, or consisting of:

(A) from 50 wt %, or 55 wt %, or 60 wt %, or 65 wt %, or 70 wt %, or 75 wt % to 80 wt %, or 85 wt %, or 90 wt % of the first ethylene-based polymer (such as an ethylene/octene copolymer), and the first ethylene-based polymer has (i) a density from 0.895 g/cc, or 0.894 g/cc, or 0.897 g/cc to 0.902 g/cc, or 0.903 g/cc, or 0.904 g/cc, or 0.905 g/cc, and (ii) a melt index from 0.1 g/10 min, or 0.5 g/10 min, or 1.0 g/10 min to 2.0 g/10 min, or 3.0 g/10 min, or 5.0 g/10 min, or 10.0 g/10 min;

(B) from 8 wt %, or 10 wt %, or 15 wt % to 20 wt %, or 25 wt %, or 30 wt %, or 35 wt %, or 40 wt %, or 45 wt %, or 48 wt % of the second ethylene-based polymer, and the second ethylene-based polymer has (i) a density from 0. 0.935 g/cc, or 0.940 g/cc, 0.941 g/cc, or 0.942 g/cc to 0.950 g/cc, or 0.955 g/cc, or 0.957 g/cc, or 0.958 g/cc, or 0.959 g/cc, or 0.960 g/cc, or 0.965 g/cc, or 0.967 g/cc; and (ii) a melt index from 0.1 g/10 min, or 0.5 g/10 min, or 1.0 g/10 min to 2.0 g/10 min, or 5.0 g/10 min, or 10.0 g/10 min, or 15 g/10 min, or 20 g/10 min, or 25 g/10 min, or 30 g/10 min, or 35 g/10 min, or 40 g/10 min, or 45 g/10 min, or 50 g/10 min, or 60 g/10 min, or 70 g/10 min, or 80 g/10 min, or 90 g/10 min, or 100 g/10 min, or 110 g/10 min, or 120 g/10 min, or 130 g/10 min, or 140 g/10 min, or 150 g/10 min, or 160 g/10 min;

(C) from 0.01 wt %, or 0.02 wt %, or 0.05 wt % to 0.1 wt %, or 0.15 wt %, or 0.20 wt %, or 0.25 wt %, or 0.50 wt %, or 1.0 wt %, or 1.5 wt %, or 2.0 wt % slip agent, wherein the slip agent is a fatty acid amide such as erucamide;

(D) from 0 wt %, or 0.1 wt %, or 0.2 wt % to 0.3 wt %, or 0.5 wt %, or 1.0 wt %, or 2.0 wt %, or 3.0 wt %, or 5.0 wt % additive;

the polymeric blend and/or the composition, having:
(i) an overall density from 0.900 g/cc, or 0.905 g/cc, or 0.908 g/cc to 0.910 g/cc, or 0.915 g/cc, or 09.20 g/cc, or 0.925 g/cc; and
(ii) optionally, a Δ Density from 0.039 g/cc, or 0.040 g/cc to 0.061 g/cc, or 0.062 g/cc, or 0.063 g/cc, or 0.064 g/cc, or 0.065 g/cc; and
(iii) optionally, a Δ MI from 0 g/10 min to 4 g/10 min, or 15 g/10 min, or 20 g/10 min, or 50 g/10 min, or 100 g/10 min, or 125 g/10 min, or 150 g/10 min, or 152 g/10 min, or 155 g/10 min; and the first layer has a COF after aging for 1 week at 60° C. from 0.001, or 0.050, or 0.100 to 0.250, or 0.300, or 0.330, or 0.360, or 0.397, or 0.398, or 0.399, or 0.400; and one, some or all of the following properties:
(a) an initial COF from 0.001, or 0.050, or 0.090 to 0.100, or 0.110, or 0.140, or 0.150, or 0.152, or 0.160, or 0.170, or 0.180, or 0.190, or 0.200; and/or
(b) a light transmission from 90%, or 92% to 94%, or 95%, or 99%, or 100%; and/or
(c) a haze from 0.5%, or 1.0% to 2.0%, or 2.5%, or 3.0%, or 3.5%, or 4.0%, or 4.5%, or 5.0%, or 5.5%, or 6.0%, or 10%, or 15%, or 20%; and/or
(d) an initial surface roughness from 20 nm to 25 nm, or 29 nm, or 30 nm, or 35 nm, or 40 nm; and/or
(e) a surface roughness after aging for 1 week at 60° C. from 20 nm, or 22 nm to 25 nm, or 29 nm, or 30 nm, or 35 nm, or 40 nm, or 45 nm; and/or
(f) a HSIT from 70° C., or 75° C., or 80° C. to 84° C., or 85° C., or 90° C., or 95° C.; and/or
(g) a thickness from 5 μm, or 10 μm, or 15 μm, or 20 μm, or 25 μm to 30 μm, or 40 μm, or 50 μm, or 55 μm.

In an embodiment, the first layer has at least 1, or at least 2, or at least 3, or at least 4, or at least 5, or at least 6, or all 7 of properties (a)-(g).

In an embodiment, the film is a multilayer film containing a second layer. The second layer directly contacts the first layer. The term "directly contacts," as used herein, is a layer configuration whereby the first layer is located immediately adjacent to the second layer and no intervening layers, or no intervening structures, are present between the first layer and the second layer. The second layer has two opposing surfaces. In an embodiment, the second layer is a continuous layer with two opposing surfaces.

In an embodiment, the second layer contains metal foil, polyamide (such as Nylon 6; Nylon 6/6; Nylon 6/66; Nylon 6/12; Nylon 12; etc.), ethylene-base polymer, ethylene/vinyl alcohol (EVOH) copolymer, polybutylene terephthalate (PBT), polyethylene terephthalate (PET), ethylene/acrylic acid (EAA) copolymer, ethylene/methacrylic acid (EMAA) copolymer, polylactic acid, cellulosic material (such as paper), or combinations thereof. In an embodiment, the second layer contains PET.

In an embodiment, the film, or further the multilayer film, has a thickness from 25 μm, or 30 μm, or 40 μm, or 50 μm to 55 μm, or 60 μm, or 70 μm, or 80 μm, or 90 μm, or 100 μm, or 110 μm, or 120 μm, or 130 μm, or 140 μm, or 150 μm, or 200 μm, or 250 μm, or 300 μm.

In an embodiment, the film is formed as a blown film, or further a blown multilayer film, with the first layer and the second layer in direct contact with each other.

In an embodiment, the first layer containing the composition including the polymeric blend is a skin layer. A "skin layer" is an outermost layer of the film structure. In other words, at least one surface of a skin layer is an outermost surface of the film.

In an embodiment, the first layer containing the composition including the polymeric blend is a seal layer.

In an embodiment, the film excludes propylene-based polymers.

In an embodiment, the film excludes silicones. In a further embodiment, the film excludes PDMS.

The film may comprise two or more embodiments disclosed herein.

The present disclosure also provides an article containing the multilayer film, such as a package. Nonlimiting examples of suitable packages include food packages and specialty packages.

By way of example, and not limitation, some embodiments of the present disclosure will now be described in detail in the following Examples.

EXAMPLES

Materials used in the examples are provided in Table 1 below.

TABLE 1

| Material/Description | Properties | Source |
|---|---|---|
| AFFINITY ™ PL 1880G (ethylene/1-octene copolymer) (plastomer/elastomer) | MI (I2)(190° C./2.16 kg) = 1.0 g/10 min, Density = 0.902 g/cc, Melting point = 99° C. | The Dow Chemical Company |
| AFFINITY ™ PF 1140G (ethylene/1-octene copolymer) (plastomer/elastomer) | MI (I2)(190° C./2.16 kg) = 1.6 g/10 min, Density = 0.897 g/cc, Melting point = 96.1° C. | The Dow Chemical Company |
| AFFINITY ™ PL 1840G (ethylene/1-octene copolymer) (plastomer/elastomer) | MI (I2)(190° C./2.16 kg) = 1.0 g/10 min, Density = 0.909 g/cc, Melting point = 106° C. | The Dow Chemical Company |
| PE-C (ethylene/1-octene copolymer) (LLDPE) | MI (I2)(190° C./2.16 kg) = 1.0 g/10 min, Density = 0.924 g/cc, Melting point = 117.7° C. | |

TABLE 1-continued

| Material/Description | Properties | Source |
|---|---|---|
| PE-D (ethylene/1-octene copolymer) (HDPE) | MI (I2)(190° C./2.16 kg) = 170.1 g/10 min, Density = 0.941 g/cc, Melting point = 128.2° C. | |
| PE-E (ethylene/1-octene copolymer) (HDPE) | MI (I2)(190° C./2.16 kg) = 820.0 g/10 min, Density = 0.940 g/cc, Melting point = 119.6° C. | |
| PE-F (ethylene/1-octene copolymer) (HDPE) | MI (I2)(190° C./2.16 kg) = 1.0 g/10 min, Density = 0.942 g/cc, Melting point = 129.0° C. | |
| PE-G (ethylene/1-octene copolymer) (HDPE) | MI (I2)(190° C./2.16 kg) = 4.9 g/10 min, Density = 0.958 g/cc, Melting point = 133.3° C. | |
| PE-H (ethylene/1-octene copolymer) (HDPE) | MI (I2)(190° C./2.16 kg) = 19.3 g/10 min, Density = 0.958 g/cc, Melting point = 133.8° C. | |
| PE-I (ethylene/1-octene copolymer) (HDPE) | MI (I2)(190° C./2.16 kg) = 153.5 g/10 min, Density = 0.957 g/cc, Melting point = 133.6° C. | |
| CRODAMIDE ™ ER-BR | Erucamide | Croda Polymer Additives |

Monolayer blown films are prepared with the compositions outlined in Table 2. The monolayer films are 50.8 μm (2 mils) thick.

The prepared film samples are collected as rolls and stored for at least 1 week at ambient conditions (<25° C., 101.325 kPa, <60% relative humidity), after which specimens are cut for the measurement of the initial COF and initial surface roughness. The results are reported in Table 2.

A separate set of specimens cut from the film rolls are aged for 1 week at 60° C. (101.325 kPa, <60%% relative humidity) in air and allowed to equilibrate at ambient conditions for 1 day, and then the 60° C. aged COF and 60° C. aged surface roughness are measured. The results are reported in Table 2.

Film samples are then heat sealed according to ASTM F-88 (technique A). The film rolls are conditioned for a minimum of 40 hours at 23° C. (±2° C.) and 50% (±10%) relative humidity in accordance with ASTM D-618 (procedure A). Then, specimen sheets are cut from the film rolls in the machine direction to a length of approximately 27.94 cm (11 inches) and a width of approximately 21.59 cm (8.5 inches). The sheets are heat sealed across the machine direction on a Kopp™ Heat Sealer over a range of temperatures under the following conditions: Sealing Pressure=0.275 N/mm$^2$; Sealing Dwell Time=0.5 seconds; Depth of Seal=5 mm. The sealed sheets are conditioned for a minimum of 3 hours at 23° C. (±2° C.) and 50% (±10%) relative humidity and cut into 2.54 cm (1 inch) wide strips. The cut strips are conditioned fora minimum of 24 hours after sealing at 23° C. (±2° C.) and 50% (±10%) relative humidity prior to HSIT testing.

For HSIT testing, the strips are loaded into the grips of a INSTRON® Tensiomer at an initial separation of 5.08 cm (2 inches) and pulled at a grip separation rate of 10 in/min (4.2 mm/sec or 250 mm/min) at 23° C. (±2° C.) and 50% (±10%) relative humidity. The strips are tested unsupported. Six replicate tests are performed for each sealing temperature. The maximum force at failure is recorded. HSIT is defined as the temperature at which the average maximum force reaches 13.34 N. The results are reported in Table 3.

TABLE 2

| | PE Component 1 | | PE Component 2 | | | | | | 60° C. | | | | Light |
|---|---|---|---|---|---|---|---|---|---|---|---|---|---|
| | Ethylene-Based Polymer | wt % | Ethylene-Based Polymer | wt % | Erucamide (wt %) | Overall Density (g/cc) | Δ density[1] (g/cc) | Δ MI[2] g/10 min | Initial COF[3] | Aged COF[4] | Initial SR (nm)[5] | 60° C. Aged SR (nm)[6] | Haze (%) | Trans-mission (%) |
| CS 1 | AFFINITY ™ PL 1840G | 99.90 | — | — | 0.1 | 0.909 | NA | NA | 0.157 | 0.559 | 11.8 | 12.3 | 2.2 | 93.1 |
| CS 2 | AFFINITY ™ PL 1880G | 64.94 | PE-C | 34.96 | 0.1 | 0.910 | 0.022 | 0.0 | 0.153 | 0.597 | | | 3.1 | 93.5 |
| CS 3 | AFFINITY ™ PL 1880G | 79.92 | PE-D | 19.98 | 0.1 | 0.910 | 0.039 | 169.1 | 0.192 | 0.496 | 18.5 | 21.6 | 8.2 | 93.3 |
| CS 4 | AFFINITY ™ PL 1880G | 79.92 | PE-E | 19.98 | 0.1 | 0.909 | 0.038 | 819.0 | 0.128 | 0.489 | | | 5.4 | 93.4 |
| Ex 1 | AFFINITY ™ PL 1880G | 79.92 | PE-F | 19.98 | 0.1 | 0.910 | 0.040 | 0.0 | 0.133 | 0.397 | 23.5 | 24.2 | 4.5 | 92.9 |
| Ex 2 | AFFINITY ™ PF 1140G | 79.92 | PE-G | 19.98 | 0.1 | 0.909 | 0.061 | 3.3 | 0.152 | 0.201 | 28.6 | 32.5 | 15.5 | 93.1 |
| Ex 3 | AFFINITY ™ PF 1140G | 79.92 | PE-H | 19.98 | 0.1 | 0.909 | 0.061 | 17.7 | 0.107 | 0.359 | 28.9 | 32.7 | 16.9 | 93.3 |
| Ex 4 | AFFINITY ™ PL 1880G | 79.92 | PE-I | 19.98 | 0.1 | 0.908 | 0.061 | 151.9 | 0.096 | 0.327 | 25.9 | 26.8 | 18.3 | 93.2 |

CS = Comparative Sample

[1] Δ density = | density of Component 1-density of Component 2 |

[2] Δ MI = | MI of Component 1-MI of Component 2 |

[3] Coefficient of Friction (COF) after film is stored for 1 week at ambient conditions.

[4] Coefficient of Friction (COF) after film is aged for 1 week at 60° C.

[5] Initial SR is the initial surface roughness (SR) of the film, measured after film is stored for 1 week at ambient conditions.

[6] 60° C. Aged SR is the surface roughness (SR) of the film after the film is aged for 1 week at 60° C.

TABLE 3

| | PE Component 1 | | PE Component 2 | | | | | |
|---|---|---|---|---|---|---|---|---|
| | Ethylene-Based Polymer | wt % | Ethylene-Based Polymer | wt % | Erucamide (wt %) | Overall Density (g/cc) | Δ density[1] (g/cc) | Δ MI[2] (g/10 min) | HSIT[3] (° C.) |
| CS 1 | AFFINITY™ PL 1840G | 99.90 | — | — | 0.1 | 0.909 | NA | NA | 91 |
| CS 2 | AFFINITY™ PL 1880G | 64.94 | PE-C | 34.96 | 0.1 | 0.910 | 0.022 | 0.0 | 86 |
| CS 3 | AFFINITY™ PL 1880G | 79.92 | PE-D | 19.98 | 0.1 | 0.910 | 0.039 | 169.1 | 90 |
| CS 4 | AFFINITY™ PL 1880G | 79.92 | PE-E | 19.98 | 0.1 | 0.909 | 0.038 | 819.0 | 88 |
| Ex 1 | AFFINITY™ PL 1880G | 79.92 | PE-F | 19.98 | 0.1 | 0.910 | 0.040 | 0.0 | 84 |
| Ex 2 | AFFINITY™ PF 1140G | 79.92 | PE-G | 19.98 | 0.1 | 0.909 | 0.061 | 3.3 | 80 |
| Ex 3 | AFFINITY™ PF 1140G | 79.92 | PE-H | 19.98 | 0.1 | 0.909 | 0.061 | 17.7 | 80 |
| Ex 4 | AFFINITY™ PL 1880G | 79.92 | PE-I | 19.98 | 0.1 | 0.908 | 0.061 | 151.9 | 80 |

CS = Comparative Sample
[1] Δ density = | density of Component 1-density of Component 2 |
[2] Δ MI = | MI of Component 1-MI of Component 2 |
[3] HSIT = Heat Seal Initiation Temperature A comparative sample film produced with a layer containing a single ethylene-based polymer and a slip agent (CS 1) with an overall density of 0.909 g/cc exhibits a low initial COF (0.157), but a high COF after aging for 1 week at 60° C. (0.559). Likewise, comparative sample films produced with a layer containing a polymeric blend with two ethylene-based polymers having a Δ density less than 0.039 g/cc and a slip agent (CS 2-4) with an overall density of 0.909-0.910 g/cc exhibit a low initial COF (0.128-0.192), but a high COF after aging for 1 week at 60° C. (0.400).

Applicant surprisingly discovered that films produced with a layer containing a polymeric blend with two ethylene-based polymers having a Δ density of 0.039-0.065 g/cc and a slip agent (Ex. 1-4) with an overall density of 0.908-0.910 g/cc advantageously have a low initial COF (0.001-0.400) and a low COF after aging for 1 week at 60° C. (0.001-0.400). These results demonstrate that the increase in COF typically caused by exposure to high temperatures (here, 60° C.) is avoided, or mitigated, in the present polymeric blend.

It is specifically intended that the present disclosure not be limited to the embodiments and illustrations contained herein, but include modified forms of those embodiments including portions of the embodiments and combinations of elements of different embodiments as come within the scope of the following claims.

We claim:

1. A composition comprising:
   a polymeric blend comprising
   (A) from 50 wt % to 90 wt % of a first ethylene-based polymer having a density from 0.895 g/cc to 0.905 g/cc; and a melt index from 0.1 g/10 min to 50 g/10 min;
   (B) from 8 wt % to 48 wt % of a second ethylene-based polymer having a density from 0.935 g/cc to 0.967 g/cc; and a melt index from 0.1 g/10 min to 180 g/10 min;
   (C) from 0.01 wt % to 2.0 wt % of a slip agent, based on the total weight of the polymeric blend;
   the polymeric blend having (i) an overall density from 0.900 g/cc to 0.925 g/cc; and (ii) a coefficient of friction (COF) after aging for 1 week at 60° C. from 0.001 to 0.400.

2. The composition of claim 1, wherein the polymeric blend has a difference between the density of the first ethylene-based polymer and the density of the second ethylene-based polymer (Δ Density) from 0.039 g/cc to 0.065 g/cc.

3. The composition of claim 1, wherein the polymeric blend has a difference between the melt index of the first ethylene-based polymer and the melt index of the second ethylene-based polymer (Δ MI) from 0 g/10 min to 155 g/10 min.

4. The composition of claim 1, wherein the slip agent is selected from the group consisting of a fatty acid amide, a silicone, and combinations thereof.

5. The composition of claim 1, wherein the slip agent is a fatty acid amide.

6. The composition of claim 1, wherein the first ethylene-based polymer is an ethylene/octene copolymer having a density from 0.897 g/cc to 0.902 g/cc, and the second ethylene-based polymer is an ethylene/octene copolymer having a density from 0.942 g/cc to 0.958 g/cc.

7. The composition of claim 1, wherein the polymeric blend comprises:
   (A) from 50 wt % to 85 wt % of the first ethylene-based polymer, the first ethylene-based polymer having a density from 0.897 g/cc to 0.902 g/cc;
   (B) from 8 wt % to 30 wt % of the second ethylene-based polymer, the second ethylene-based polymer having a density from 0.942 g/cc to 0.958 g/cc;
   (C) from 0.01 wt % to 2.0 wt % erucamide; and
   the overall density of the polymeric blend is from 0.905 g/cc to 0.920 g/cc.

8. A multilayer film comprising a first layer comprising the composition of claim 1.

9. The multilayer film of claim 8, wherein the first layer has a coefficient of friction (COF) after aging for 1 week at 60° C. from 0.050 to 0.400.

10. The multilayer film of claim 8, wherein the first layer has an initial COF from 0.001 to 0.400.

11. The multilayer film of claim 8, wherein the first layer has an initial surface roughness from 10 nm to 40 nm.

12. The multilayer film of claim 8, wherein the first layer has a surface roughness after aging for 1 week at 60° C. from 10 nm to 45 nm.

13. The multilayer film of claim 8, wherein the first layer has a light transmission from 90% to 100% and a haze from 0.5% to 30%.

14. The multilayer film of claim 8, wherein the first layer is a seal layer.

15. The composition of claim 2 wherein the composition has an initial coefficient of friction from 0.001 to 0.200.

16. A composition comprising:
a polymeric blend comprising
- (A) from 50 wt % to 90 wt % of a first ethylene-based polymer having a density from 0.895 g/cc to 0.905 g/cc; and a melt index from 0.1 g/10 min to 50 g/10 min;
- (B) from 8 wt % to 48 wt % of a second ethylene-based polymer having a density from 0.935 g/cc to 0.967 g/cc; and a melt index from 0.1 g/10 min to 180 g/10 min;
- (C) from 0.01 wt % to 2.0 wt % of a slip agent, based on the total weight of the polymeric blend;

the polymeric blend having
- (i) an overall density from 0.900 g/cc to 0.925 g/cc;
- (ii) a difference between the density of the first ethylene-based polymer and the density of the second ethylene-based polymer ($\Delta$ Density) from 0.039 g/cc to 0.065 g/cc;
- (iii) an initial coefficient of friction from 0.001 to 0.200; and
- (iv) a coefficient of friction (COF) after aging for 1 week at 60° C. from 0.001 to 0.400.

17. The composition of claim 16 comprising 0.01 wt % to 1.0 wt % of the slip agent that is a fatty acid amide.

18. The composition of claim 17 wherein the polymeric blend has a difference between the melt index of the first ethylene-based polymer and the melt index of the second ethylene-based polymer ($\Delta$ MI) from 0 g/10 min to 155 g/10 min.

19. A multilayer film comprising a first layer comprising the composition of claim 18, the first layer having a heat seal initiation temperature from 65° C. to 85° C.

20. The multilayer film of claim 19, wherein the first layer has a surface roughness after aging for 1 week at 60° C. from 10 nm to 45 nm.

* * * * *